US005600882A

United States Patent [19]
Beane

[11] Patent Number: 5,600,882
[45] Date of Patent: Feb. 11, 1997

[54] PALLET DISMANTLING MACHINE

[76] Inventor: Timothy R. Beane, 35560 E. Royalton Rd., Grafton, Ohio 44044

[21] Appl. No.: 385,907

[22] Filed: Feb. 9, 1995

[51] Int. Cl.[6] .................................................. B23P 19/00
[52] U.S. Cl. .......................... 29/822; 29/239; 29/426.4; 29/426.3
[58] Field of Search ................................. 29/239, 426.3, 29/426.4, 822; 83/788, 943

[56] References Cited

U.S. PATENT DOCUMENTS 2,593,843  4/1952  Cannon ................................. 29/426.4
5,214,849  6/1993  Jones, Jr. ............................... 29/426.3

Primary Examiner—David P. Bryant
Attorney, Agent, or Firm—Rankin, Hill, Lewis & Clark

[57] ABSTRACT

A method and apparatus for dismantling pallets and the like. A pallet to be dismantled is placed on a work table and moved in a direction of travel parallel to the stringers until the first deckboard located on the bottom of the stringers, comes into engagement with a guiding means that accurately positions the interface between the respective deckboard and the stringers. This also places the interface in alignment with a band saw cutting span. As the pallet is moved into the blade in guided fashion, the interface is cut together with the nails so as to free the respective deckboard from the rest of the pallet. This process is repeated sequentially until the entire pallet has been moved through the cutting span. Then the pallet is flipped over to place the deckboards on the opposite side on the table surface and the same operation is repeated to completely dismantle the pallet.

10 Claims, 6 Drawing Sheets

PALLET DISMANTLING MACHINE

BACKGROUND OF THE INVENTION

This invention relates to load pallets fabricated with lumber components including stringers and cross deckboards, of the type commonly used in material handling and storage applications. More particularly, the invention relates to the dismantling (or disassembly) of used pallets to provide lumber for the fabrication of new pallets having different dimensions; and especially to an apparatus for cutting through the interface between the stringers and the deckboards so as to separate the components into separate lengths of lumber.

Load bearing pallets for use in supporting various articles and materials, for transport and storage, are generally fabricated by nailing cross deckboards to both sides of two or more generally parallel stringers spaced from one another. The stringers are commonly lengths of 2×4 lumber and define interior open-ended spaces. These spaces are adapted to receive for example, the lift arms of a fork lift truck. This permits the article or material secured to the pallet to be lifted and carried by the fork lift truck and to be stored in a convenient manner. Once the article or material has been removed from the pallet, the pallet is generally no longer usable and is often merely stacked for disposal. It is usually the obligation of the pallet fabricator to retrieve the pallet since there is no convenient way for the property owner at the pallet's final destination to dispose of it.

Since pallets are initially fabricated in a great many different dimensions and configurations, it is unlikely that the pallet fabricator can reuse the pallet in its original form. Also, pallets often have broken or damaged cross deckboards after the article or material secured thereto is removed.

For these reasons and others, it is common practice for the pallet fabricator to dismantle used pallets and to use the resulting lumber to fabricate new pallets of different dimensions and configurations. In order to do this, rather than pull the nails, it is much easier to cut through the interface between the cross deckboards and the stringers (and thus through the nails) to separate the cross deckboards from the stringers.

Prior art machines for this operation have frequently used rotary cutting blades such as shown and described in U.S. Pat. Nos. 3,869,780; 4,241,495; 4,346,506; 4,392,403; 4,586,235; 4,750,255; 4,945,626; 5,105,526; 5,205,197; 5,211,094; 5,243,751 and 5,323,525. These machines require several passes of the pallet past the cutting wheels and this makes the process time consuming and costly.

A better approach is to use a band saw with a horizontal cutting span adapted to engage a pallet at the interface between the stringers and cross deckboards along the entire length of the cross deckboards. This type of machine is shown in U.S. Pat. No. 5,201,110. As the pallet is fed toward the blade, all of the cross deckboards on one side of the pallet may be removed in one pass. The partially dismantled pallet may then be flipped over and passed through the blade again to remove the cross deckboards on the other side and thus complete the dismantling process.

Prior art machines, however, require careful, vertical adjustment of either the band saw cutting span or of the table height in order to accurately position the cutting span at the interface between the stringers and the cross deckboards prior to each pass. This adjustment must usually be made for each individual pallet since the thickness of the cross deckboard varies from one pallet to another. This requirement seriously limits the production capability of the machine.

Another problem encountered is that of sorting and removing the lengths of lumber from the work surface once the dismantling is completed. This process delays the feeding of another pallet into the band saw blade.

A further problem is that the operator at the input end must often support the weight of the pallet as it is fed into the band saw cutting span. This can create serious fatigue over a period of time.

Still another problem is that of flipping a partially dismantled pallet over for the second pass through the band saw blade. Here again, the time and effort required limits the speed with which the dismantling task can be completed.

Also, in some instances, a pass through the band saw blade must be halted or interrupted part way through the process and the pallet retracted. Then the pallet must be spun around and restarted through the band saw blade beginning with the opposite end. Here again, the need to spin the pallet around and restart the pass causes operator fatigue over a period of time.

The machine of the present invention reduces the difficulties described above and affords other features and advantages heretofore not obtainable.

SUMMARY OF THE INVENTION

In accordance with the present invention, there is provided a table assembly adapted to support a pallet thereon for movement in a horizontal direction parallel to the stringers of the pallet. The machine includes a band saw assembly wherein the saw has a cutting span extending horizontally above the table surface perpendicular to the direction of travel of the pallet to define an input side of the table surface and an output side thereof. The cutting span of the endless band saw blade is adapted to engage and cut the pallet at the interface between the stringers and the cross deckboards. Located in the output side of the table surface, is an opening that permits deckboards cut by the band saw cutting span to drop through and thus be removed from the working surface.

The machine also includes at least 2 fixed pallet guides extending parallel to the stringers and adapted to extend into the open spaces between the stringers when the pallet is moved in its direction of travel through the machine. The guides have lower surface portions adapted to engage the top surface of a deckboard as a pallet is moved into engagement therewith.

The machine also includes resilient elements located below the pallet guides and adapted to engage the bottom surface of a deckboard to urge the deckboard upwardly into engagement with the pallet guides so that the respective deckboard is engaged by and between the guides and the resilient elements. This positions the pallet during movement in its direction of travel, to place the upper surface of the deckboard (i.e. the interface between the stringers and deckboards) in horizontal alignment with the band saw cutting span.

The machine further includes a chute and conveyor assembly so that cross deckboards falling through the opening described above are guided by the chute onto a conveying span of an endless conveyor belt which moves the board laterally away from the table. A second conveyor assembly may be provided to receive boards end wise from the first conveyor assembly and raise them to a discharge position.

The machine also includes a flipping bar that spans the table laterally parallel to the band saw blade and located on the input side of the table surface to aid the operator in flipping the partially dismantled pallet over prepatory to its second pass through the cutting span of the band saw blade. The input surface portion of the table assembly is provided with a relatively large surface area to permit a pallet to be spun around should it be necessary to restart a pallet through the blade from the opposite end of the pallet.

DESCRIPTION OF THE PREFERRED EMBODIMENT

Figure 1:
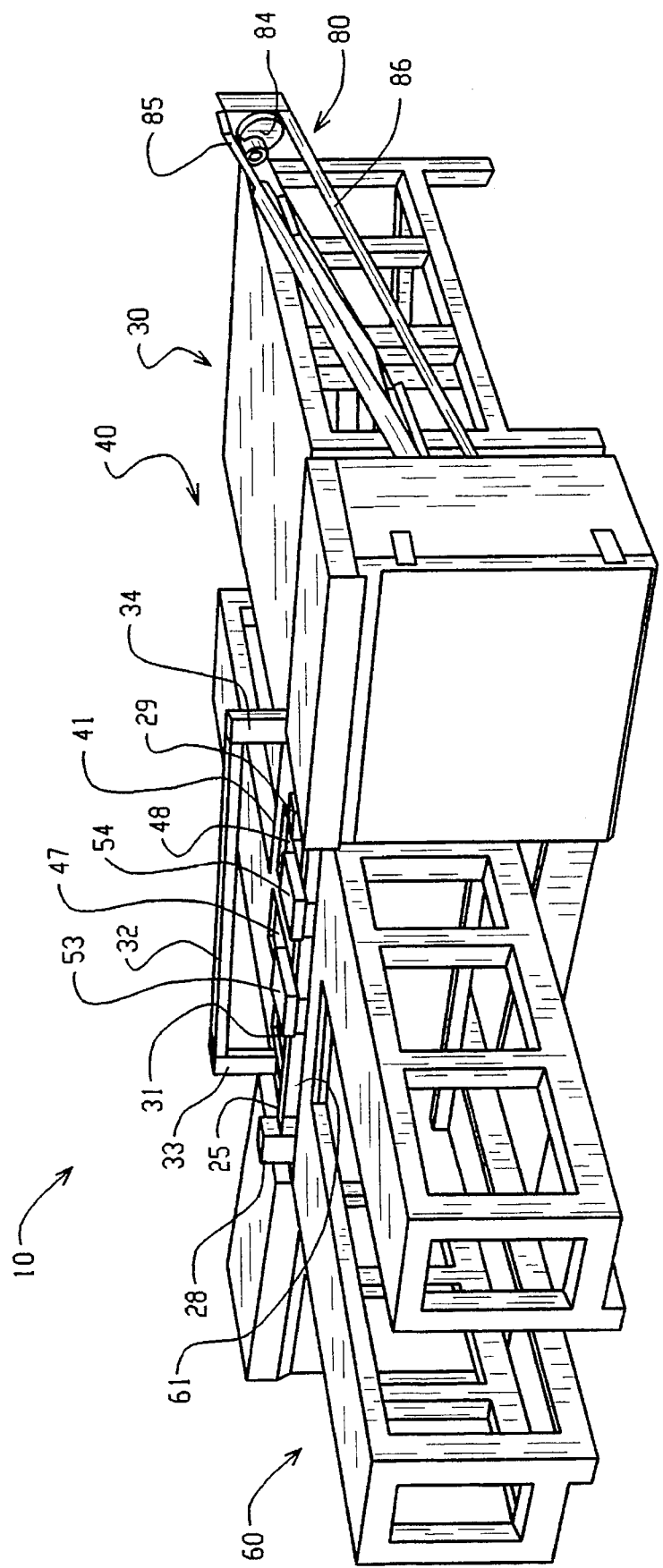
FIG. 1 is a perspective view of a pallet dismantling machine embodying the invention.
Figure 2:
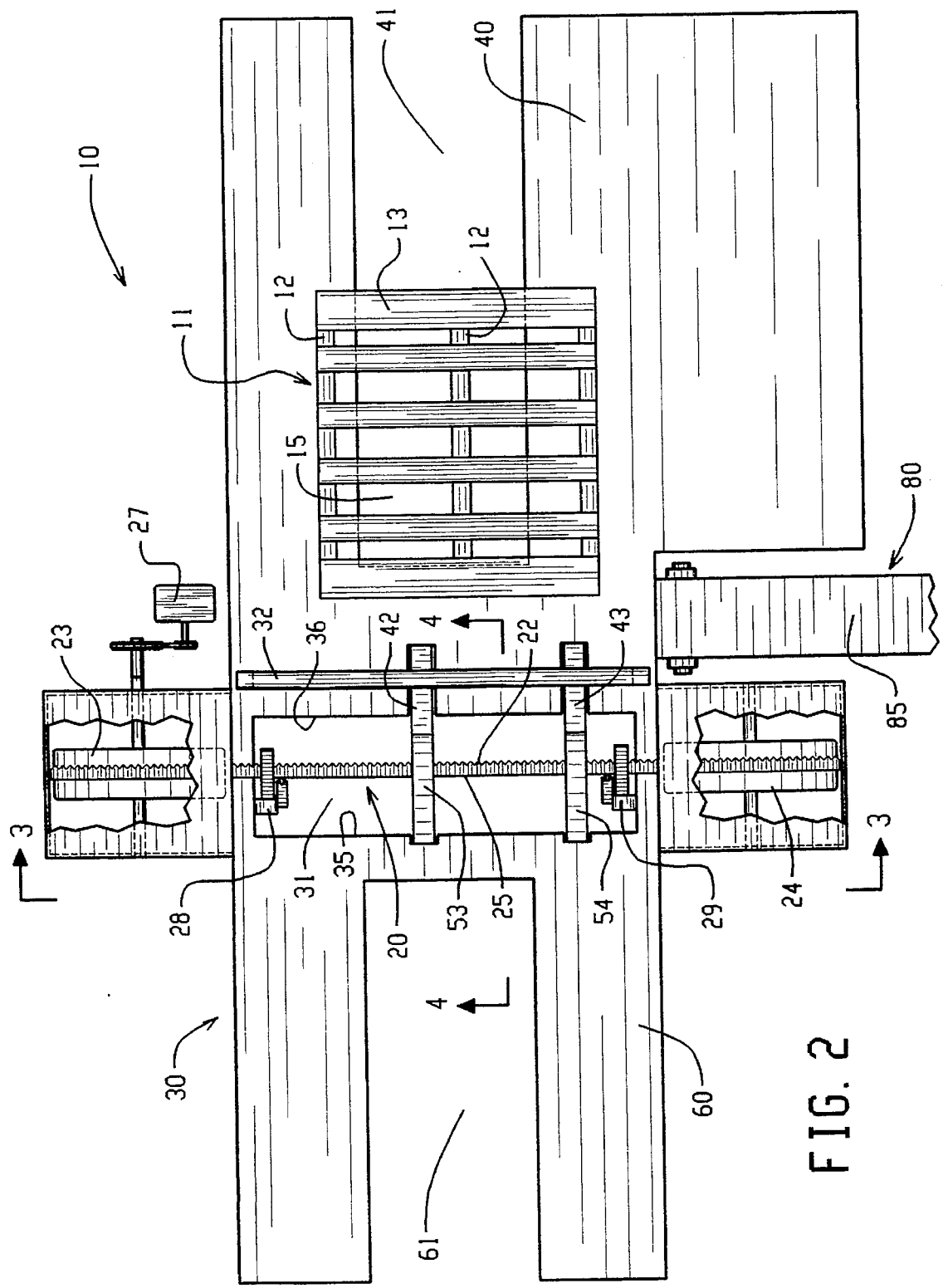
FIG. 2 is a plan view of the dismantling machine of FIG. 1.
Figure 3:
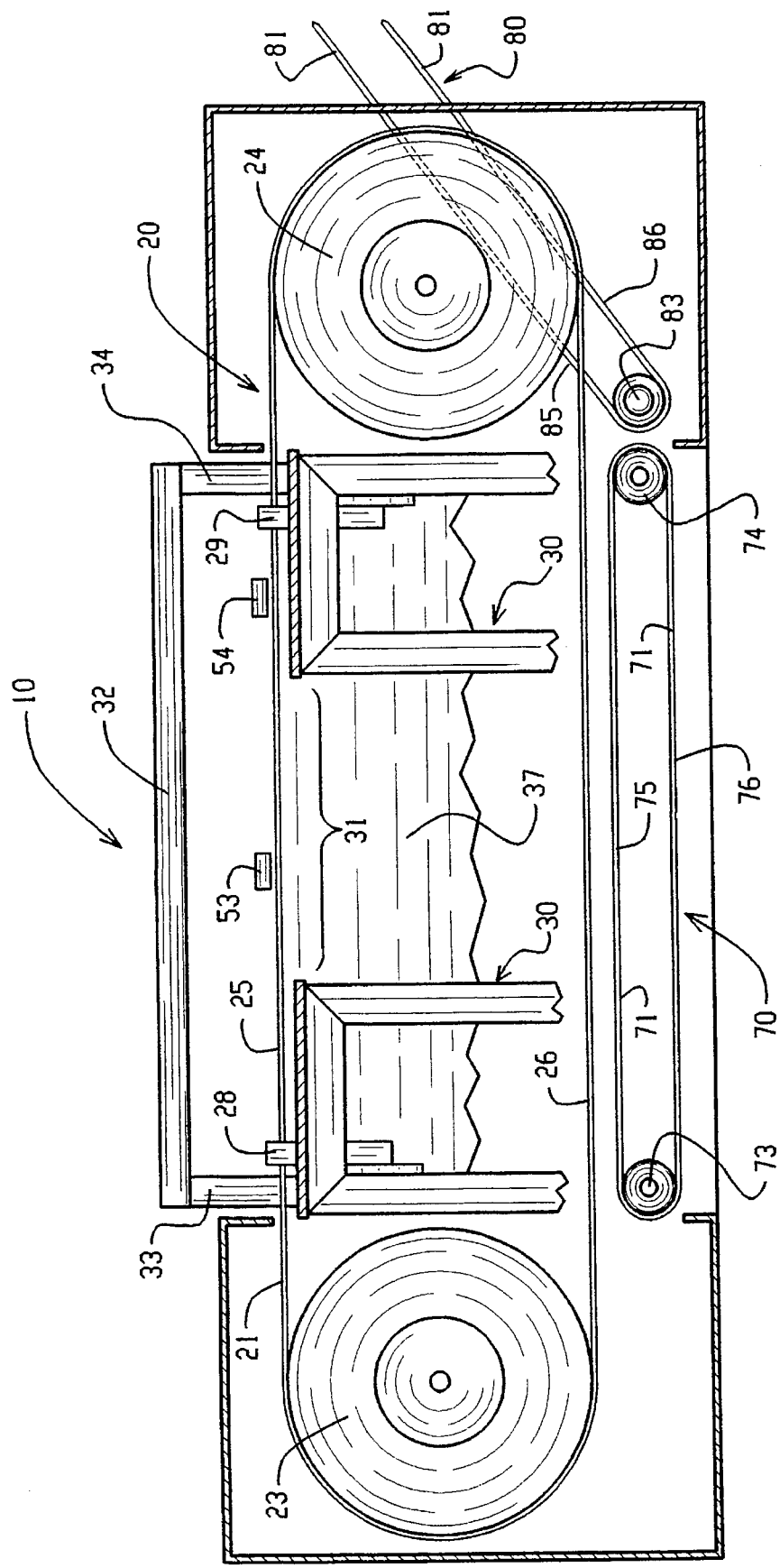
FIG. 3 is an end elevational view of the pallet dismantling machine of FIGS. 1 and 2 with parts broken away for the purpose of illustration.
Figure 4:
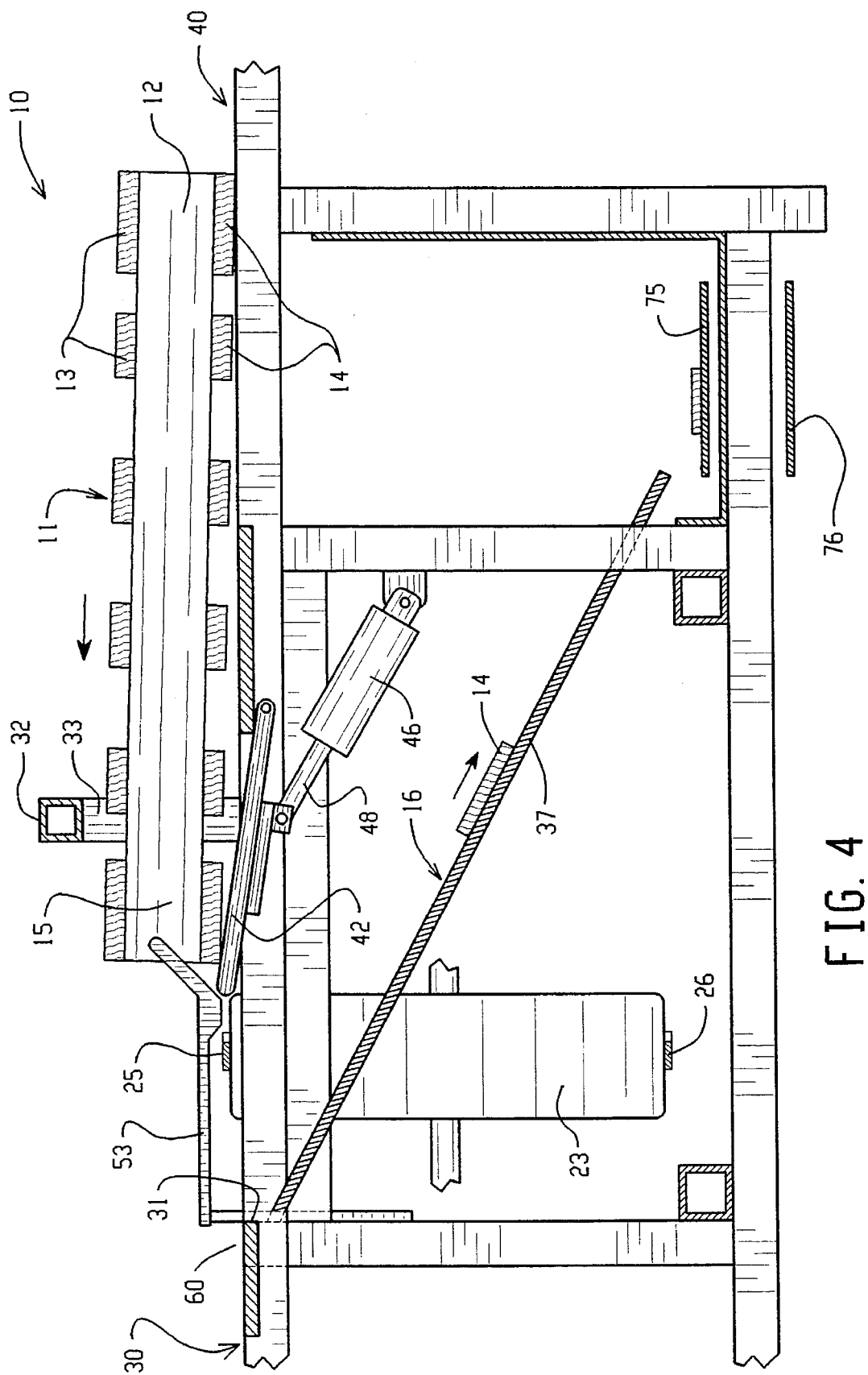
FIG. 4 is a fragmentary sectional view taken on the line 4—4 of FIG. 2.
Figure 5:
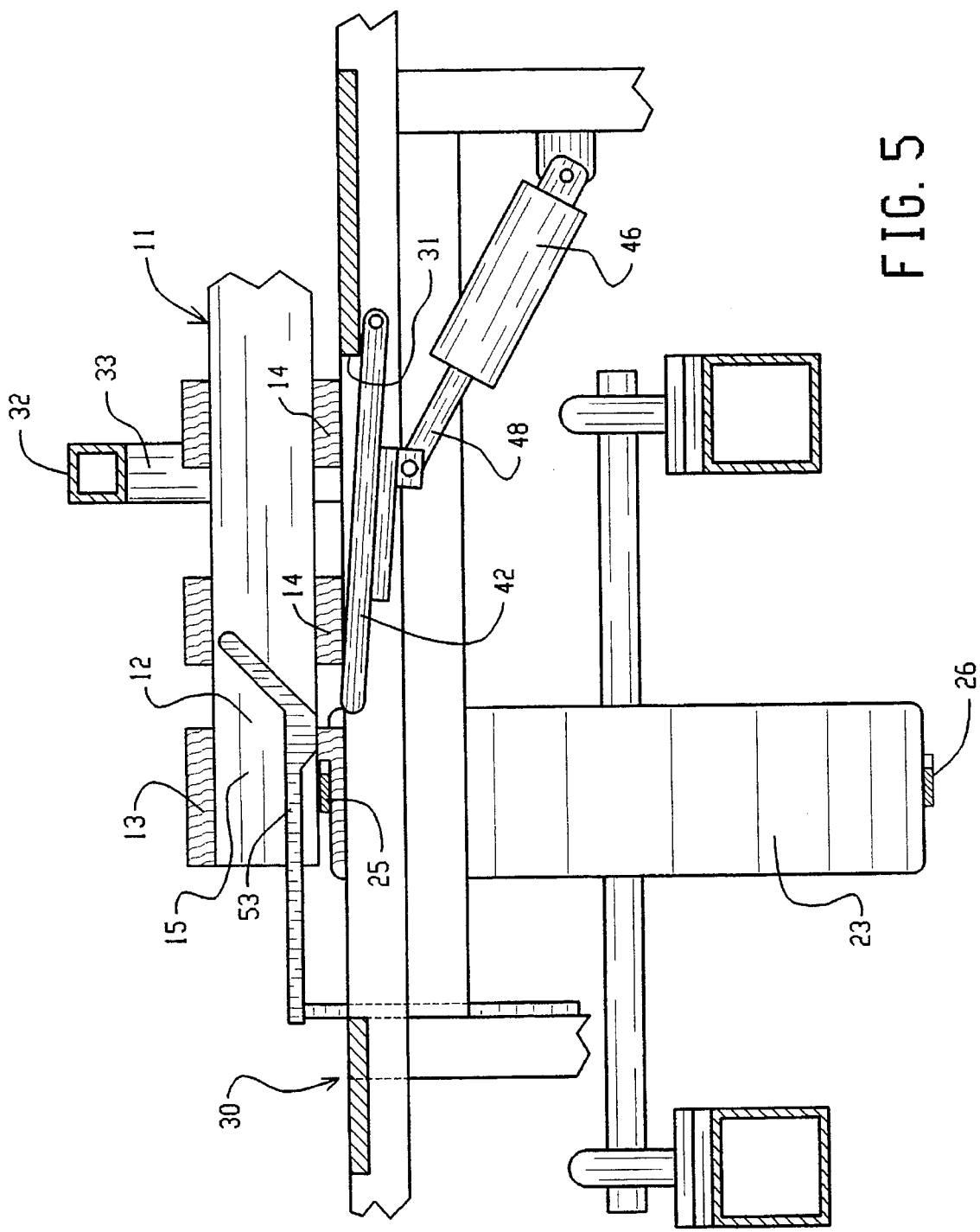
FIG. 5 is a fragmentary sectional view on an enlarged scale also taken on the line 4—4 of FIG. 2.
Figure 6:
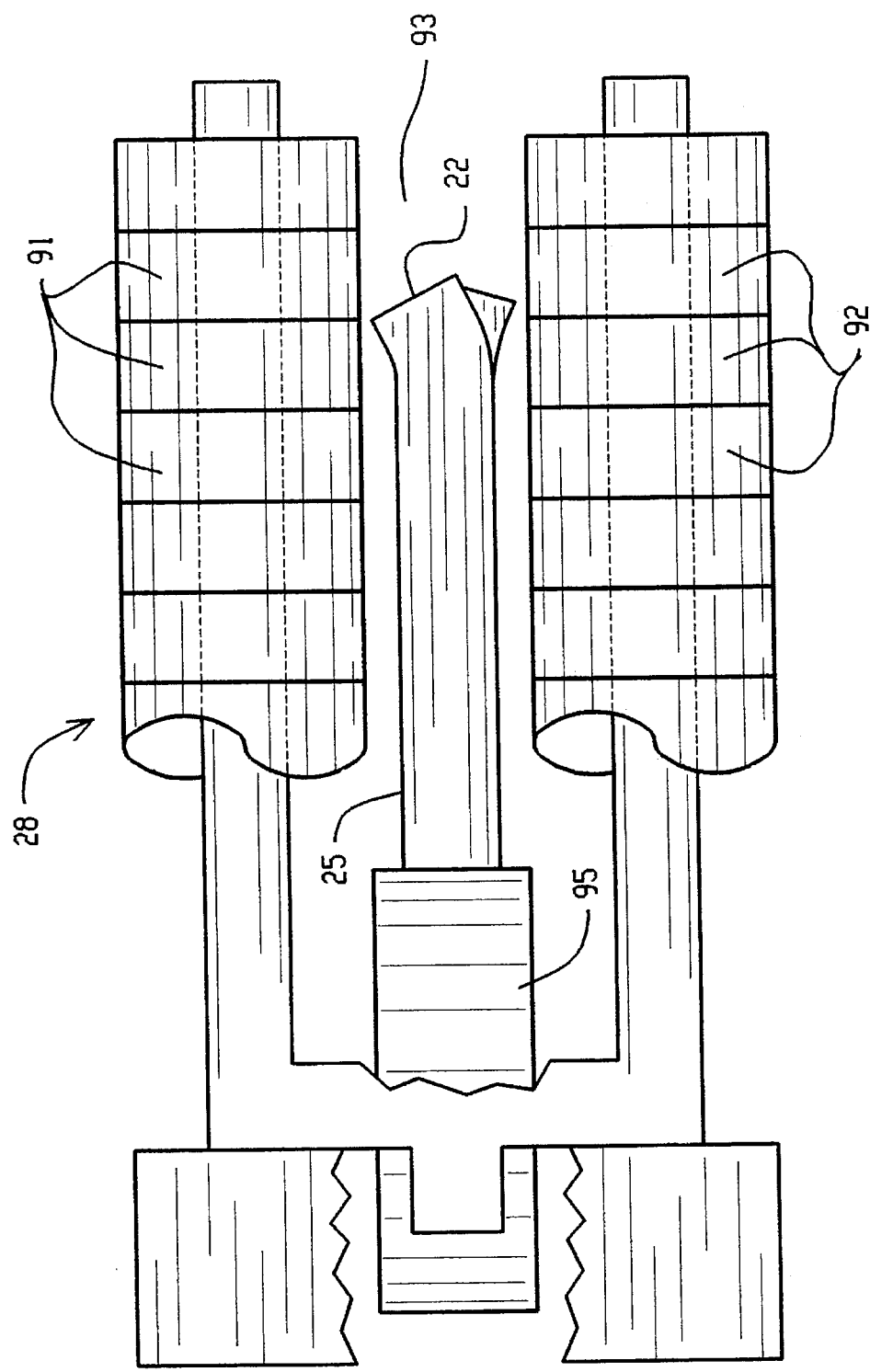
FIG. 6 is a fragmentary sectional view on an enlarged scale illustrating one of the blade guide assemblies for the machine of the invention.

Referring more particularly to the drawings and initially to FIGS. 1 and 2, there is shown a pallet dismantling machine 10 embodying the invention. The machine is adapted to dismantle a load pallet 11 which may be of many different configurations, but which includes as its basic components, two or more spaced parallel stringers 12 usually formed of 2×4 lumber and cross deckboards nailed to both sides of the stringers to include first cross deckboards 13 on one side and second cross deckboards 14 on the other side. The stringers 12 define open ended spaces 15 which are adapted to receive the forks of a fork lift truck or other material handling apparatus.

The pallets 11 to be dismantled are fed in one direction with the stringers 12 aligned paralleled to the direction of travel. In one pass through the machine, the first cross deckboards 13 (i.e. those nailed to the bottom of the stringers 12) are removed after which the partially dismantled pallet is flipped over and returned to the input table portion of the machine for a second pass in the same direction of travel in order to remove the second cross deckboards 14, and thus complete the dismantling of the pallet.

During the dismantling procedure, the cross deckboards 13 and 14 drop through a chute 16 after which they are automatically removed from the machine by conveyor assemblies and the stringers 12 are manually removed and stacked by a worker. The procedure is usually performed by two workers, one at the input side and one at the output side of the machine 10.

The machine 10 includes as its basic components a band saw assembly 20, a table assembly 30 having an input portion 40 and an output portion 60 and a pair of conveyor assemblies 70 and 80.

The band saw assembly 20 is supported by the table assembly 30 and includes an endless band saw blade 21 provided with cutting teeth 22. The band saw blade may be, for example, 1¼ inches wide with a 0.042 in. thickness. A suitable configuration has 3 teeth per inch.

The assembly 20 further includes a drive pulley 23 and an idler pulley 24 which support the blade 21 for movement in a path of travel that includes a horizontal cutting span 25 located slightly above the level of the supporting surface of the table assembly 30 and a horizontal return span 26 located below the cutting span 25. The drive pulleys may be, for example, pneumatic tires having a tread diameter of about 31 inches. These are the type generally used on light trucks. The drive pulley 23 is mounted on a shaft connected to a drive motor 27 which may include a belt drive arrangement of the type well known to those skilled in the art. The cutting span 25 is preferably set with about a 3° upward tilt to achieve an optimum cutting effect.

Located at opposite ends of the cutting span 25 are a pair of blade guide assemblies 28 and 29 to be described in more detail below.

The table assembly 30, as indicated above, includes an input portion 40 and an output portion 60. The table has an upper surface that defines an opening 31 that extends laterally across the central portion of the table perpendicular to the direction of travel of the pallet as it progresses through the machine. The opening divides the table into an input surface portion 40 and the output surface portion 60.

Located on the input portion 40 and extending laterally across the table, perpendicular to the direction of travel of the pallet 11, is a flipping bar 32 mounted on a pair of bar supports 33 and 34 at each end. The flipping bar 32 is spaced between 8 and 10 inches above the surface of the table assembly, for example, and provides a convenient means by which a worker at the output side of the machine can take a partially dismantled pallet, place one end on the bar 32 and then flip it over prior to the second pass through the machine. This must be accomplished in order to remove the second cross deckboards 14 from the stringers 12, and thus complete the dismantling.

The opening 31 has a forward side edge 35 and a rearward side edge 36 spaced from the edge 35. The side edges are spaced from and parallel to one another, the toward edge being located somewhat upstream from the cutting span 25 of the band saw blade 21 and the output edge being located downstream of the cutting span sufficiently that once a cross deckboard 13, 14 has been cut free of the stringers 12 to which it is nailed, it drops freely through the opening 31. An angled plate 37 extends downwardly and rearwardly from a location closely adjacent the forward edge 35 of the opening 31 so as to provide a chute that guides the cross deckboard downwardly and laterally between the cutting span 25 and return span 26 of the band saw blade 21 and then onto the first conveyor assembly 70.

The input portion 40 of the table assembly 30 is provided with a worker opening 41 in which a worker can position himself to feed pallets 11 in the direction of travel through the machine. With the worker so positioned, large surface areas are provided on both his right and left sides to support pallets in a variety of ways during the dismantling operation.

At least 2 resilient arms 42 and 43 are mounted on the table assembly parallel to one another and extending from a pivot point forwardly in the direction of travel and somewhat upwardly so that they engage the first cross deckboard 13, 14 of each pallet 11 being fed into the machine. Each resilient arm 42, 43 has an air cylinder 46, 47 tending to urge it in an upward direction. One end of each air cylinder 46, 47 is pivotally connected to the table assembly and the other end has a piston rod 48, 49 which extends to a pivot point on the bottom of each resilient arm 42 and 43.

The air cylinders 46, 47 act as a resilient means urging the arms in an upward direction. However, they will pivot downwardly as necessary when in engagement with the respective cross deckboard.

The output surface portion 60 of the table assembly 30 also has a worker opening 61 formed therein so that a worker at the output end of the machine can be positioned in a convenient location.

At least two guide members 53 and 54 parallel to one another and extending parallel to the direction of travel of the pallets 11, are mounted on the output portion and extend rearwardly or in an upstream direction toward the moving pallet 11. The guide members are spaced sufficiently above the table that they align with and are adapted to be received in the open ended spaces 15 between the pallet stringers 12. The forward ends of the guide members 53 and 54 extend somewhat downwardly and are adapted to engage the upper surface of the cross deckboards 13, 14. The outer ends of the resilient arms 42 and 43 are located immediately below the ends of the guide members 53, 54.

Accordingly, when a pallet 11 is moved in its intended direction of travel, the first cross deckboard presented will be engaged by both the resilient arms 42 and 43 and by the guide members 53 and 54 in such a way that the upper surface of the respective cross deckboard will be urged against the outer ends of the guide members 53 and 54. This serves to locate the upper surface portion, (and thus the interface between the respective cross deckboard and the pallet stringers) in accurate alignment with the cutting span 25 of the endless band saw blade 21. With this guiding arrangement, the band saw will always be aligned accurately with the interface where the cut is to be made.

Also, it will be noted that the guide members 53, 54, because they enter the spaces 15 between the stringers 12, may be engaged by the side walls of one of the stringers to prevent lateral movement of the pallet 11 due to the forces generated by the cutting action of the band saw blade 21. That cutting action will normally tend to pull the pallet in the direction of travel of the blade as the cutting occurs. As such movement occurs, one of the stringers will be brought into engagement with a guide member 53, 54 and prevent further lateral movement of the pallet 11 during the cutting operation.

As indicated above, once a cross deckboard 13, 14 has been freed from the stringers 12 to which it was nailed, it drops downwardly and engages the diagonally extending plate 37. The angled plate directs the board onto a span of the first conveyor assembly 70. The conveyor assembly includes an endless belt 71 carried and guided by a drive pulley 73 and an idler pulley 74. The endless belt 71 has a carrier span 75 and a return span 76 that moves in the opposite direction.

The carrier span 75 receives the removed cross deckboards and transports them end wise toward the second conveyor assembly 80. The second conveyor assembly 80 has an endless belt 81 that extends between a drive pulley 83 and an idler pulley 84. Thus, the belt 81 has a carrier span 85 and a return span 86 moving in the opposite direction. The pulleys 83 and 84 are so located, that the carrier span 85 extends in an angular direction outwardly and upwardly relative to the first conveyor assembly 70. This transports the cross deckboards to a location from which they may be dropped into a receptacle or removed and stacked by a worker.

Referring more particularly to the blade guides 28 and 29 referred to above, each will be described with respect to the guide 28 since the guides are essentially identical, although located in a reverse orientation. The guides include upper and lower roller assemblies 91 and 92, the rollers of which are freely rotating on a common axle. The roller assemblies define a space 93 therebetween which receives the cutting span 25 of the band saw blade 21 and guides the blade during its movement.

Spaced in an offset position from the roller assemblies, is a side roller 95 oriented with its axis perpendicular to the axis of the two side roller assemblies 91 and 92. The side roller 95 is adapted to engage the side edge of the band saw blade 21 that is opposite the toothed edge. The movement of a pallet into the blade tends to push the blade in the direction of travel of the pallet and that the forces tending to move the blade in that direction are resisted by the side roller 95.

OPERATION

To begin the dismantling operation, one operator positions himself in the worker opening 41 on the input side of the table assembly 30 and another operator positions himself in a worker opening 61 on the output side. The drive motor 27 for the band saw assembly is turned on so that the cutting span 25 begins moving across the table in preparation for cutting free the first cross deckboard 13, 14 to be presented. Then the operator at the input side, places a pallet 11 on the table 30 with the stringers 12 aligned in the desired direction of travel and feeds the pallet forwardly toward the cutting span 25. As this movement of the pallet proceeds, the first cross deckboard on the bottom of the stringers 12 is engaged by the resilient arms 42 and 43. Shortly thereafter, the leading edge of the first cross deckboard comes into engagement with the guide members 53 and 54.

The operator then pushes the pallet positively forward and this effort causes resilient retraction of the arms 42 and 43 (thus compressing the air cylinders 46 and 47) until the respective cross deckboard is engaged between the guide members 53 and 54 and the resilient arms 42 and 43. At this point, the interface between the respective cross deckboard and the stringers is accurately aligned with the cutting span 25 of the band saw blade 21. As the operator feeds the pallet forwardly, the band saw blade cuts through the interface between the respective cross deckboard and the stringers until all the nails are cut and the cross deckboard is freed from the rest of the pallet.

When this is done, the freed cross deckboard falls through the opening 31 and engages the angled plate 37 which guides the board angularly downward through the band saw blade 21 and on to the carrier span 75 of the endless belt 71 forming part of the first conveyor assembly 70. The conveyor assembly conveys the respective cross deckboard end wise until it is fed on to the carrier span 85 of the endless belt 81 of the second conveyor assembly 80. The carrier span 85 carries the cross deckboard in an end wise direction angularly upward to a discharge position from which the cross deckboard may be removed by a worker, dropped into a receiver bin or otherwise collected.

Meanwhile, the worker continues to feed the pallet 11 in its direction of travel toward the cutting span 25 and in this way, all of the cross deckboards on the bottom side of the pallet are cut and removed. The worker on the output side grasps the partially dismantled pallet as the cutting operation proceeds until all of the bottom cross deckboards have been separated and dropped on to the endless belt 71. Then the output end worker lifts the partially disassembled pallet and places the bottom surfaces of the stringers on the flipping bar 32. Next, he pivots the pallet upwardly so that the end of the stringers furthest away from him drop on to the table on the input side. He then pushes the outer end of the pallet to pivot the pallet in a manner that places the cross deckboards on the opposite side at the bottom faces of the stringers. Finally, the cutting operation is completed as all of the cross deckboards are cut by the cutting span 25 and thus removed.

It will be apparent that all of the cross deckboards 13, 14 dropped through the opening 31 and are removed from the machine by the conveyor assemblies 70 and 80. The stringers 12, however, remain on the table at the output side and the worker merely removes them and stacks them in a convenient manner.

If during the cutting of one of the cross deckboards, a misalignment of the blade 25 and pallet 11 occurs so that the cut is not proceeding through the interface. One of the workers may then knock the partially cut deckboard through the opening 31 to remove it from the stringers. The worker at the input side then merely retracts and removes the pallet from the cutting area. Then he may place the pallet on the large part of the table surface located to his left where it may be spun around 180° so as to place the opposite end of the pallet toward the direction of travel. He then reintroduces the pallet to the blade in the direction of travel until the operation is complete.

While the invention has been shown and described with respect to a specific embodiment thereof, this is intended for the purpose of illustration rather than limitation and other variations and modifications of the specific method and machine herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. Apparatus for dismantling a pallet having a plurality of spaced, generally parallel stringers and upper and lower deckboards extending laterally across the stringers to define open-ended spaces between the stringers, comprising:

a table assembly defining a working surface upon which a pallet can be placed and moved in a direction of travel parallel to said stringers;

a band saw assembly including a cutting span spaced above said working surface and extending angularly relative to said direction of travel;

said cutting span being adapted to engage and cut said pallet at interfaces between deckboards and stringers, an opening in said table surface located to receive deckboards cut free of the stringers by said cutting span whereby said freed deckboards fall downwardly through said opening;

deckboard guide means adapted to extend into said open-ended spaces when said pallet is moved in said direction of travel, said guide means being adapted to engage the top of a deckboard as said pallet is moved in said direction of travel; and at least two arms extending parallel to said direction of travel, said arms having upstream ends and downstream ends and being pivotally connected at their upstream ends to said table, the downstream ends of said arms being adapted to engage the bottom surface of said deckboard as said pallet is moved in said direction of travel;

and means biasing said arms upwardly to urge the downstream ends of said arms into lifting engagement with said deckboard to raise said deckboard upwardly into engagement with said deckboard guide means whereby said deckboard is engaged by and between said deckboard guide means and said arms;

whereby said pallet is positioned, during movement in said direction of travel, such that the interface between said stringers and a respective deckboard is in alignment with said cutting span.

2. Apparatus as defined in claim 1 wherein said biasing means comprises pneumatic cylinders.

3. Apparatus as defined in claim 1 wherein the downstream ends of said arms are located in registration with said fixed deckboard guide means.

4. Apparatus as defined in claim 1 including a chute located below said opening for guiding freed deckboards downwardly from said opening to a location below said table surface.

5. Apparatus as defined in claim 4 including conveyor means for receiving deckboards from said chute and conveying said deckboards in an endwise direction away from said table assembly.

6. Apparatus as defined in claim 5 wherein said conveyor means comprises a first endless belt-type conveyor assembly adapted to convey said deckboards horizontally out from under said table assembly and a second endless belt-type conveyor assembly adapted to receive deckboards from said first conveyor assembly and transport them upwardly and outwardly to a discharge position.

7. Apparatus as defined in claim 1 further including a pallet flipping bar spaced above and extending laterally across said table surface parallel to said cutting span and located upstream thereof, whereby a worker located downstream of said cutting span can place an end of a partially dismantled pallet on said flipping bar and flip the pallet over so that it rests upstream of said cutting span in an upside down orientation.

8. Apparatus as defined in claim 1 wherein a portion of said table assembly located upstream of said direction of travel and a portion of said table assembly located downstream of said direction of travel each have a worker opening formed therein whereby a worker can be positioned on the input side to move pallets in said direction of travel and another worker can be positioned on the output side to receive partially dismantled pallets and stringers.

9. Apparatus for dismantling a pallet having a plurality of spaced, generally parallel stringers and upper and lower deckboards extending laterally across the stringers to define open-ended spaces between the stringers, comprising:

a table assembly defining a working surface upon which a pallet can be placed and moved in a direction of travel parallel to said stringers;

a band saw assembly including a cutting span spaced above said working surface and extending angularly relative to said direction of travel;

said cutting span being adapted to engage and cut said pallet at interfaces between deckboards and stringers;

an opening in said table surface located to receive deckboards cut free of the stringers by said cutting span whereby said freed deckboards fall downwardly through said opening;

a chute located below said opening for guiding freed deckboards downwardly from said opening to a location below said table surface;

deckboard guide means adapted to extend into said open-ended spaces when said pallet is moved in said direction of travel, said guide means being adapted to engage the top of a deckboard as said pallet is moved in said direction of travel; and resilient means adapted to engage the bottom surface of said deckboard as said pallet is moved in said direction of travel, and to urge said deckboard upwardly into engagement with said deckboard guide means whereby said deckboard is engaged by and between said deckboard guide means and said resilient means;

whereby said pallet is positioned, during movement in said direction of travel, such that the interface between said stringers and a respective deckboard is in alignment with said cutting span.

10. Apparatus for dismantling a pallet having a plurality of spaced, generally parallel stringers and upper and lower deckboards extending laterally across the stringers to define open-ended spaces between the stringers, comprising:

a table assembly defining a working surface upon which a pallet can be placed and moved in a direction of travel parallel to said stringers;

a band saw assembly including a cutting span spaced above said working surface and extending angularly relative to said direction of travel;

said cutting span being adapted to engage and cut said pallet at interfaces between deckboards and stringers;

an opening in said table surface located to receive deckboards cut free of the stringers by said cutting span whereby said freed deckboards fall downwardly through said opening;

deckboard guide means adapted to extend into said open-ended spaces when said pallet is moved in said direction of travel, said guide means being adapted to engage the top of a deckboard as said pallet is moved in said direction of travel;

resilient means adapted to engage the bottom surface of said deckboard as said pallet is moved in said direction of travel, and to urge said deckboard upwardly into engagement with said deckboard guide means whereby said deckboard is engaged by and between said deckboard guide means and said resilient means;

whereby said pallet is positioned, during movement in said direction of travel, such that the interface between said stringers and a respective deckboard is in alignment with said cutting span; and a pallet flipping bar spaced above and extending laterally across said table surface parallel to said cutting span and located upstream thereof, whereby a worker located downstream of said cutting span can place an end of a partially dismantled pallet on said flipping bar and flip the pallet over so that it rests upstream of said cutting span in an upside down orientation.

* * * * *